_United States Patent_ [11] 3,583,477

| [72] | Inventors | Marvin H. Zille<br>Beloit, Wis.;<br>Roger P. Engelke, Rockford, Ill. |
|---|---|---|
| [21] | Appl. No. | 836,824 |
| [22] | Filed | June 26, 1969 |
| [45] | Patented | June 8, 1971 |
| [73] | Assignee | Barber-Colman Company<br>Rockford, Ill. |

[54] AIR INDUCTION BOX
11 Claims, 7 Drawing Figs.

[52] U.S. Cl. .................................................. 165/39,
165/123, 98/38
[51] Int. Cl. .................................................. B60h 1/00
[50] Field of Search ........................................... 165/39, 40,
16, 123; 98/38

[56] References Cited
UNITED STATES PATENTS

| 3,018,088 | 1/1962 | Allander et al. ............... | 165/123 |
| 3,422,888 | 1/1969 | Coleman et al. ............... | 165/123 |

*Primary Examiner*—Charles Sukalo
*Attorney*—Wolfe, Hubbard, Leydig, Voit and Osann ABSTRACT: Primary air flowing through the primary inlet of an air induction box is mixed with warmer air flowing into a return inlet, and the resultant mixture is delivered through an outlet at a substantially constant rate. A pressure regulator keeps the air upstream of the primary inlet at a substantially constant pressure and is constructed as a module which forms part of the box itself to enable installation of the box and the regulator as a unit. A heater optionally is employed to heat the primary air and is adapted to be installed within the box to form a unit of the box.

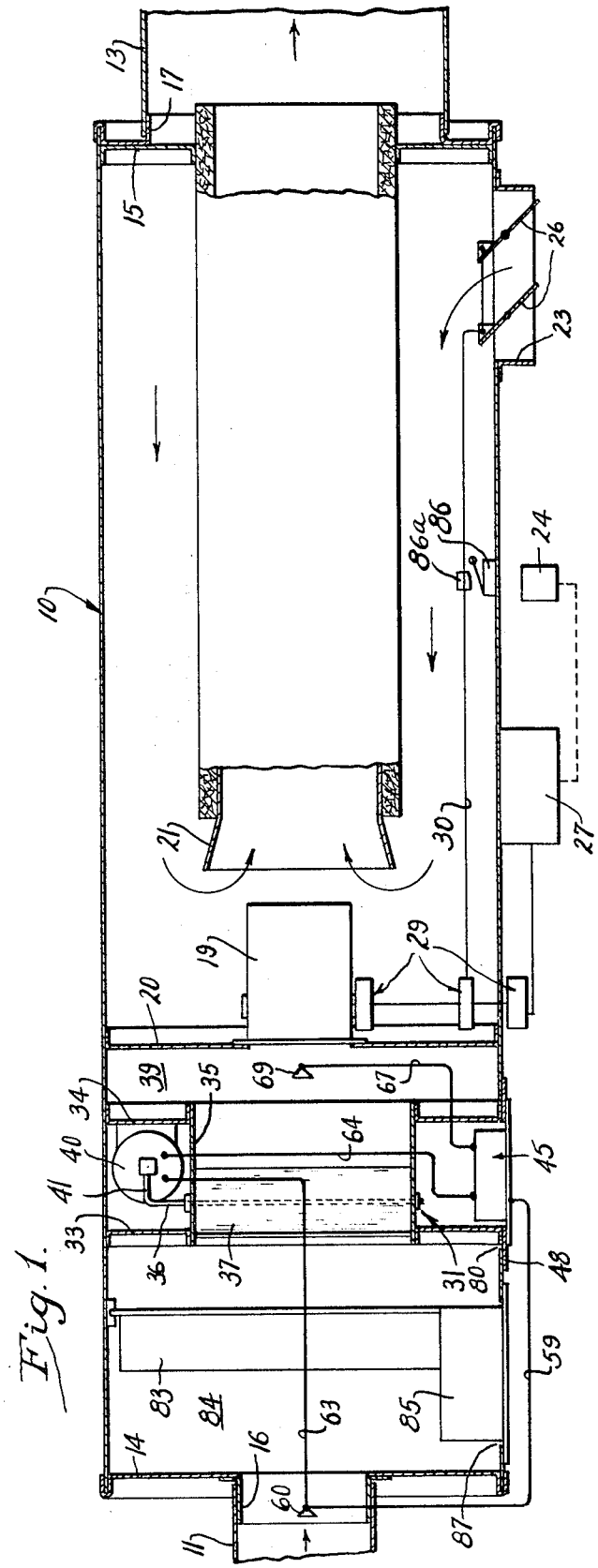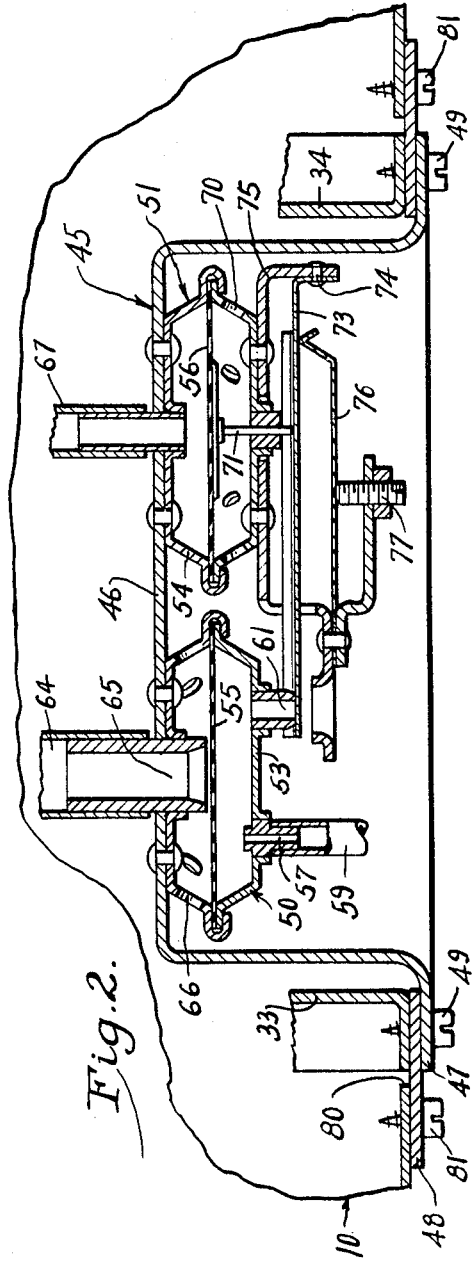

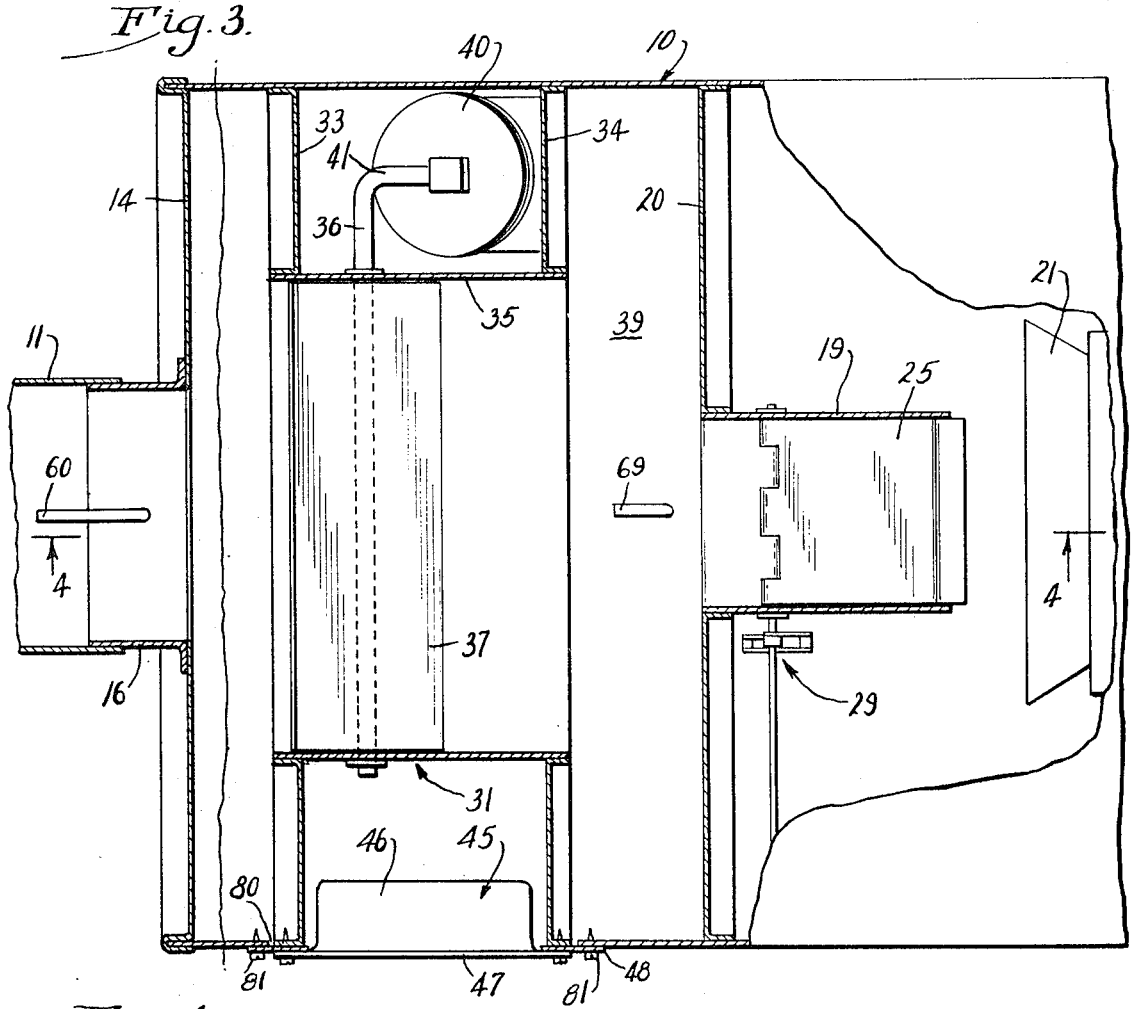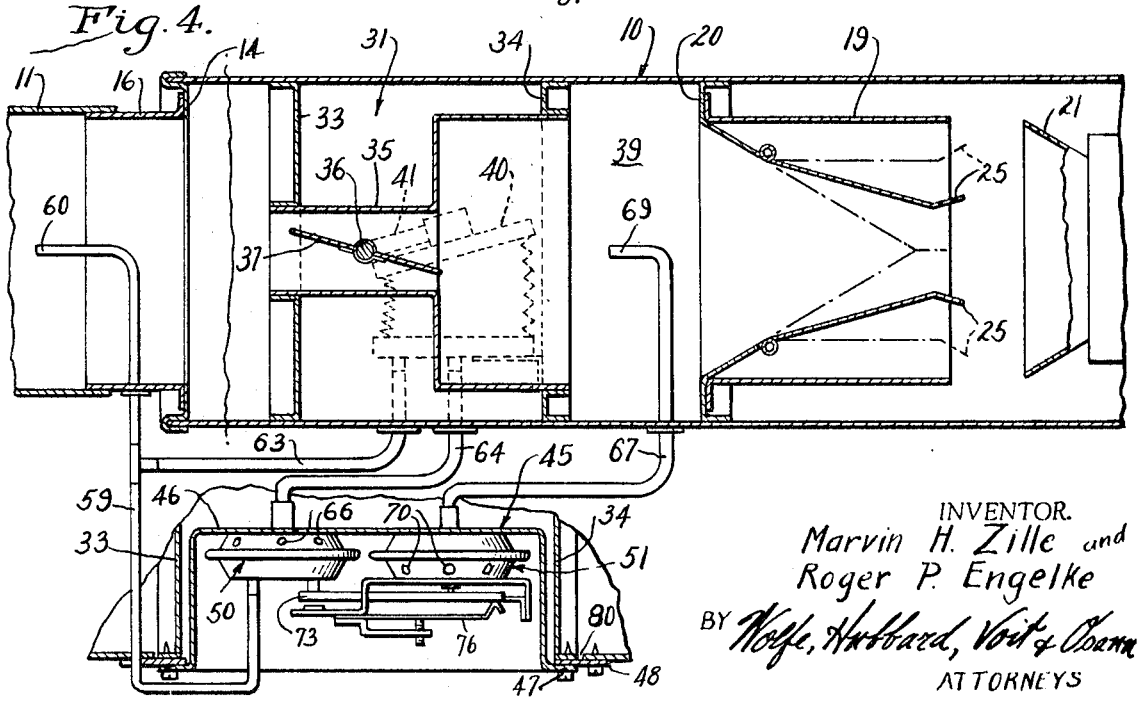

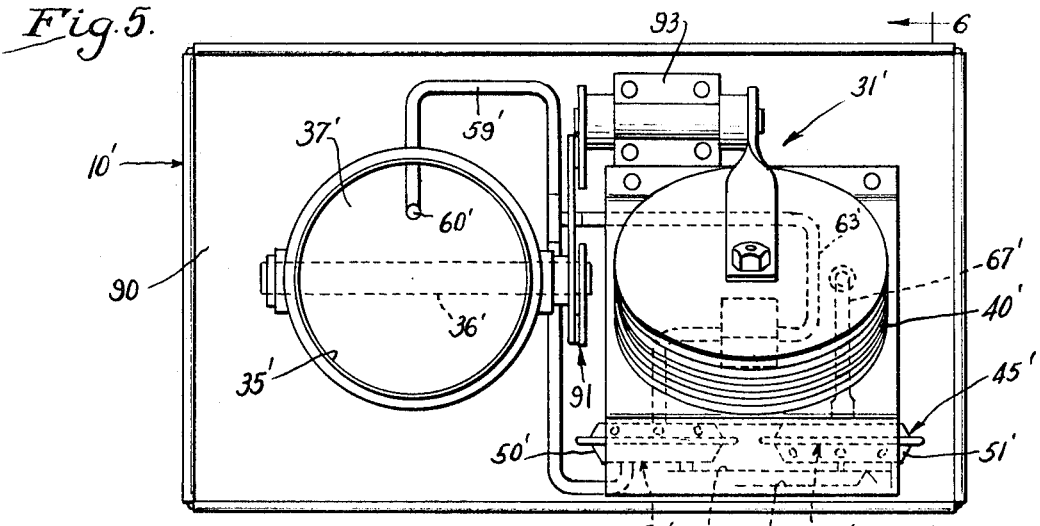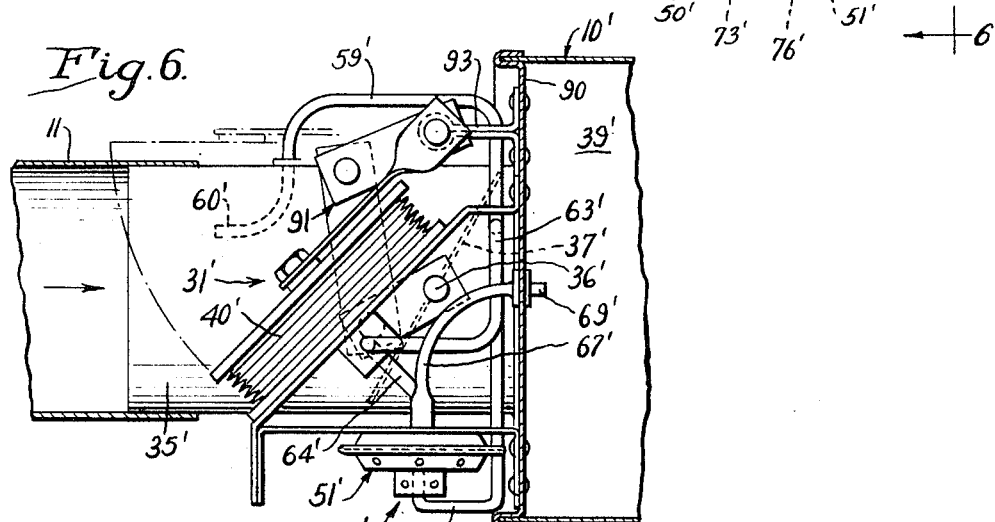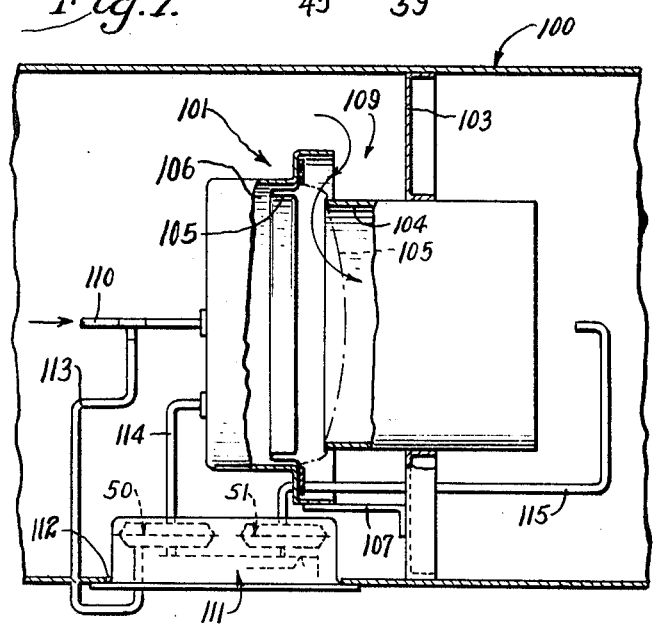

3,583,477

1

AIR INDUCTION BOX

BACKGROUND OF THE INVENTION

This invention relates to an air induction box in which a flow of primary or conditioned air though the box from a primary inlet induces a flow of secondary or return air through the box from a return inlet to provide a resultant mixture having a temperature such as to maintain a room to be conditioned at a desired temperature. The invention has more particular reference to an induction box of the type in which the flow of the mixture to the room is maintained at a substantially constant volume in spite of variations in the ratio of primary and secondary air. To help maintain a constant volume flow to the room, a pressure regulator keeps the pressure upstream of the primary inlet at a substantially constant value.

SUMMARY OF THE INVENTION

The primary aim of the present invention is to provide a new and improved air induction box of the above character having a pressure regulator whose various operating elements are arranged as a module which constitutes a unit of the box itself so as to facilitate installation of the box and the regulator and to simplify the construction thereof.

The invention also is characterized by the novel construction of the box enabling the optional installation within the box of a heater unit for raising the temperature of the primary air.

Other objects and advantages of the invention will become apparent from the following detailed description when taken in connection with the accompanying drawings.

BRIEF DESCRIPTION OF THE DRAWINGS

FIG. 1 is a fragmentary vertical cross section of one embodiment of a new and improved air induction box incorporating the novel features of the present invention, certain elements of the box being shown schematically.

FIG. 2 is an enlarged fragmentary vertical cross section of part of the pressure regulator of the box shown in FIG. 1.

FIG. 3 is an enlarged fragmentary view of parts shown in FIG. 1.

FIG. 4 is a fragmentary cross section taken substantially along the line 4—4 of FIG. 3, part of the pressure regulator being shown schematically.

FIG. 5 is an end view of a second embodiment of an air induction box incorporating the features of the invention.

FIG. 6 is a fragmentary cross section taken substantially along the line 6—6 of FIG. 5.

FIG. 7 is a cross-sectional view similar to FIG. 6 but showing still another embodiment of the air induction box.

DESCRIPTION OF THE PREFERRED EMBODIMENTS

As shown in the drawings for purposes of illustration, the invention is embodied in an air induction box 10 (FIGS. 1 to 4) usable in an air conditioning system for maintaining a room or other point of use at a desired temperature by mixing in proper proportions cooled primary air delivered through a supply or inlet duct 11 (FIG. 1) with warmer air drawn from the ceiling area of the room through a plenum (not shown) and by discharging the mixture into the room through an outlet duct 13. The air drawn into the box from the plenum is warmed by the heat of the lights in the room and by the body heat of people in the room.

Herein, the box is made of sheet metal, is of generally rectangular cross section, and includes end walls 14 and 15 having pipes 16 and 17 connected to and communicating with the inlet and outlet ducts 11 and 13, respectively. The primary air flowing through the box 10 passes from the inlet duct 11 to the outlet duct 13 through a primary air inlet 19 (FIGS. 1, 3 and 4) located adjacent the upstream end portion of the box and defined by a short length of pipe attached to a bulkhead 20 fitted within the box. After passing through the primary inlet, the primary air passes through a venturi 21 disposed within the box and, by a jet pump action, induces warmed air from the plenum to flow into the box through a return or secondary inlet 23 (FIG. 1) opening into the box near the downstream end portion thereof. The return air becomes mixed with the primary air, and the resulting mixture is conducted to the room through the venturi and the outlet duct 13. By controlling the proportions of the cool primary air and the warmer return air in the mixture, the temperature of the room may be accurately regulated.

To effect such control, the amount of return air delivered into the box 10 through the return inlet 23 is increased when the temperature of the room decreases as sensed by a thermostat 24 (FIG. 1) in the room and is decreased when the temperature of the room increases. At the same time, the rate of flow of primary air through the primary inlet 19 is changed by an amount which is substantially inversely proportional to the changes in the flow rate of the return air thereby to keep the total volume of air flowing into the room through the outlet duct 13 at a substantially constant value. Herein, the flow rates through the primary and return inlets 19 and 23 are regulated by sets of pivoted dampers 25 and 26 (FIGS. 1, 3 and 4) mounted in the primary and return inlets, respectively, and adapted to be swung to various positions opening different areas of the inlets. When the room temperature falls, a reversible motor 27 (FIG. 1) responsive to the thermostat is energized in a direction causing a linkage 29 to close the primary dampers 25 and thereby reduce the airflow through the primary inlet 19. Through a linkage 30 connected between the linkage 29 and the return dampers 26, the latter are opened to increase the flow of return air by a proportional amount. Conversely, a rise in room temperature causes the motor to be actuated in the opposite direction to open the primary dampers 25 and close the return dampers 26 to increase the flow of primary air and decrease the flow of return air by proportional amounts thereby to keep substantially the same total volume of air flowing into the room through the outlet duct 13 but at a cooler temperature. The thermostat 24 and the motor 27 are of conventional constructions such as sold by Barber-Colman Company under the trade designations TP-5143 and MP-513, respectively, and operate with a proportioning action within the narrow working range of the thermostat to move the dampers to positions corresponding to the room temperature of the thermostat.

In a system of the above character, and particularly when a number of induction boxes 10 are supplied with primary air from a common source, accurate control of the room temperature may be achieved best by maintaining substantially constant the static pressure of the air on the upstream side of the primary dampers 25. This is accomplished herein with a pressure regulator 31 operable to vary the flow of air to the primary inlet in response to pressure changes caused either as a result of repositioning of the dampers 25 or because of fluctuations in the pressure of the air supplied through the inlet duct 11.

According to the primary aspect of the present invention, the various operating elements of the pressure regulator 31 are constructed in the form of a unitized module which, when assembled to the induction box 10, becomes a unit of the box itself. With such an arrangement, the box and the pressure regulator constitute a single package and may be installed and connected between the inlet and outlet ducts 11 and 13 at the same time and as a unitary assembly. Moreover, the overall construction of the box and the regulator is simplified.

In the embodiment of the induction box 10 shown in FIGS. 1 to 4, the pressure regulator module 31 is adapted to be housed inside of the box between the end wall 14 and the primary inlet 19. Referring to the various parts in their orientation shown in the drawings, it will be seen that the regulator module includes a support which herein is formed by two upright plates 33 and 34 spaced from one another longitudinally of the box and interconnected by a short duct defining an air passage 35 establishing communication between the inlet duct 11 and the primary inlet 19. Disposed within the passage 35 and anchored to a rod 36 pivoted within the walls of the passage is an upright control damper 37 which is adapted to be swung with the rod to various adjusted positions opening and closing the passage to vary the rate of flow therethrough and thereby control the static pressure within a chamber 39 (FIG. 1) located downstream of the passage between the bulkhead 20 and the support plate 34.

To swing the damper 37 within the passage 35, a reversible actuator in the form of a resiliently extendable and angularly bendable bellows 40 is disposed within the box 10 and includes one end wall anchored to the support plate 34 and an opposite end wall connected to a crank 41 (FIG. 3) bent laterally from the upper end of the rod. When the bellows is expanded by air, the rod 34 is pivoted counterclockwise (FIG. 4) to swing the damper 37 toward an open position within the passage 35. As air is bled from the bellows, the damper is swung reversely toward a position closing off the passage.

Expansion and contraction of the bellows 40 to regulate the position of the damper 37 are governed by a control relay 45 which senses changes in the pressure in the chamber 39 from a predetermined set point and causes actuation of the bellows as a function of such changes to swing the damper in a direction and to a position changing the flow of air through the passage 35 until the pressure in the chamber again reaches the set value such that the pressure upstream of the primary dampers 25 is held substantially constant. In this instance, the control relay includes a dish-shaped cover 46 (FIG. 2) formed with a lower annular flange 47 which is attached to an annular collar 48 on the lower ends of the supporting plates 33 and 34 by mounting screws 49, the cover being disposed within the box 10 with the flange lying along the lower side of the box. Attached to the underside of the cover are a pressure regulating valve 50 (FIG. 2) and a pneumatic pressure-to-force transducer 51 formed respectively by housings 53 and 54 divided by diaphragms 55 and 56 which separate the housing into upper and lower chambers.

Through a restriction 57 (FIG. 2) the lower chamber of the valve 50 communicates with a tube 59 which extends into the inlet duct 11 (FIG. 1) and terminates in an open end 60 so as to cause air with a pressure proportional to the static pressure in the inlet duct to be conducted to the lower chamber of the valve through the tube, such air being exhausted through a bleed port 61 (FIG. 2) in the lower chamber. Also, communicating with the open end 60 of the tube 59 is a tube 63 (FIGS. 1 and 4) which leads to the bellows 40 so that part of the air flowing into the inlet duct is conducted to the bellows to cause expansion of the latter. The bellows is bled through a tube 64 which leads to an orifice 65 (FIG. 2) communicating with the upper chamber of the valve 50, the upper chamber being vented to the atmosphere through a series of ports 66 formed in the housing 53.

With the foregoing arrangement, air at system pressure is delivered to the bellows 40 through the tube 63 and is bled from the bellows and into the upper chamber of the valve 50 through the tube 64 thereby to create a downward force acting on the diaphragm 55. At the same time, air at a pressure proportional to the system pressure is conducted to the lower chamber of the valve through the tube 59 to establish a force acting upwardly on the diaphragm 55. As long as the system pressure remains constant and as long as the position of the primary dampers 25 remains unchanged, the pressure differential in the two chambers remains substantially constant to keep the diaphragm located in the same position relative to the orifice 65 so that a constant amount of air is bled through the orifice from the bellows. The bellows thus remains in a substantially static condition to keep the damper 37 located in a stationary position in the passage 35.

The pressure-to-force transducer 51 responds to the pressure in the chamber 39 and, if such pressure changes either by reason of changes in the system pressure or because of repositioning of the primary dampers 25, the transducer causes the rate of bleed from the bellows 40 to change until the bellows shifts the damper 37 to a position causing the pressure in the chamber to reassume its original value. For these purposes, a pressure sensing tube 67 (FIGS. 1 and 4) with an open end 69 positioned in the chamber 39 communicates with the upper chamber of the transducer 51 and transmits to upper chamber a pressure proportional to that in the chamber 39 thereby to create a downward force acting on the diaphragm 56. The lower chamber of the transducer is vented to the atmosphere through a series of ports 70 (FIG. 2) formed in the housing 54 and thus the upward air pressure force acting on the diaphragm 56 varies only in accordance with changes in atmospheric pressure.

Attached to the lower side of the diaphragm 56 is a plunger 71 (FIG. 2) which extends slidably through the bottom of the housing 54 into engagement with a sensing lever 73. The latter is made of flexible metal, is cantilevered at 74 to a bracket 75 on the housing 54, and is urged upwardly into engagement with the plunger by a leaf spring 76 attached to the bracket. As shown most clearly in FIG. 2, the free end of the lever underlies the bleed port 61 leading from the lower chamber of the valve 50 and constitutes a flapper whose position relative to the bleed port regulates the flow of air from the lower chamber of the valve.

As a result of the foregoing arrangement, any increase in pressure in the chamber 39 forces the diaphragm 56 downwardly to cause the plunger 71 to swing the lever 73 downwardly from the bleed port 61 and thus allow more air to escape from the lower chamber of the valve 50. Accordingly, the diaphragm 55 is forced downwardly away from the orifice 65 to allow more air to bleed from the bellows 40 so that the latter begins to collapse to close the damper 37. As closure of the damper reduces the pressure in the chamber 39 to its original set value, the forces acting on opposite sides of the transducer diaphragm 56 become balanced to cause the lever to effect a constant flow from the bleed port 61 in accordance with the prevailing pressure differential on the valve diaphragm 55 so that the damper 37 remains in its newly established position. Conversely, a decrease in the pressure in the chamber 39 causes the spring 76 to force the lever 73 upwardly to close off the bleed port 61 and effect closing of the orifice 65 to expand the bellows 40 until the damper 37 is opened sufficiently far to cause the pressure in the chamber 39 to rise to its set value. In this way, the pressure regulator 31 keeps the pressure in the chamber 39 at a substantially constant value so that a substantially constant volume flow will be maintained through the outlet duct 13 when the pressure in the inlet duct 11 changes or when the primary dampers 25 are repositioned. The particular magnitude of the pressure in the chamber 39 may be established by adjusting a screw 77 (FIG. 2) located between the bracket 75 and the spring 76 and operable to regulate the force which the spring exerts on the sensing lever 73.

It will be observed from the foregoing that all of the elements of the pressure regulator 31 are attached to a common support formed by the supporting plates 33 and 34. That is, the plates support the duct defining the passage 35 and, in addition, the damper 37, the bellows 40 and the control relay 45 all are mounted on the plates. Accordingly, the pressure regulator forms a self-contained module of comparatively simple construction and may be installed in the induction box 10 as a unitized assembly since, after the various elements have been assembled to the supporting plates, the regulator may be installed in the box simply by inserting the plates with the attached elements through an opening 80 (FIG. 2) in the lower side of the box. Suitable channels (not shown) may be attached to the inner sides of the walls of the box to slidably guide the supporting plates as the latter are slipped through the opening. Once within the box, the pressure regulator may be anchored in place by mounting screws 81 (FIGS. 2 and 3) threaded into the supporting plates and the collar 48 on the lower ends of the plates.

The construction of the pressure regulator 31 as a unitized module enables its installation in the box 10 before the latter is connected between the inlet and outlet ducts 11 and 13 so as to permit installation of both the box and the regulator into the system as a unit to simplify the installation procedure and reduce the time required therefor. In addition, the modular construction of the pressure regulator facilitates its assembly to the box either at the factory or optionally on the job according to whether the regulator is to be used in a particular system.

According to another aspect of the present invention, a heater unit 83 (FIG. 1) optionally may be installed within the box 10 itself to heat the primary air flowing through the primary inlet 19 in the event that the amount of return air in the mixture flowing through the outlet duct 13 is insufficient to maintain the room at the desired temperature. As shown in FIG. 1, the heater 83, which may be either of the electric or hot water type, is mounted in a compartment 84 of the box located between the inlet duct 11 and the damper 37 and includes a control 85 which governs activation of the heater. The control is responsive to a limit switch 86 (FIG. 1) which is positioned in the box alongside the linkage 30 to be actuated by a cam 86a on the linkage when the latter shifts to open the return dampers 26 to preset open positions and thereby increase the flow rate through the return inlet 23 to a predetermined value. Thus, if the return air in the mixture flowing from the outlet duct 13 fails to keep the room sufficiently warm even with the return dampers 26 nearly fully open, the linkage 30, as an incident to opening the return dampers, causes closing of the limit switch 86 to activate the heater so that the primary air will be warmed to increase the temperature of the mixture.

The heater 83 with its control 85 may be slipped into the box 10 through an opening 87 (FIG. 1) in the lower side thereof. Thus, when employed, the heater may be installed in the system as a unit with the box.

A modified induction box 10' embodying the novel features of the invention is shown in FIGS. 5 and 6 in which parts corresponding to those of the first embodiment are indicated by the same but primed reference numerals. Like the box 10 of the first embodiment, the box 10' includes a pressure regulator 31' which is constructed as module and which forms a unit of the box. The pressure regulator 31', however, is attached to one end of the box and is located outside of rather than within the box.

As shown in FIGS. 5 and 6, the pressure regulator 31' includes a supporting plate 90 which is attached to and covers the upstream end of the box. Mounted on the plate is a short length of pipe defining a passage 35' and adapted for direct attachment to the inlet duct 11. A damper 37' is mounted for swinging within the passage by a rod 36' and is connected by a linkage 91 to a bellows 40' having one end pivotally supported by a bracket 93 on the support plate 90. The bellows is expanded by air directed through a tube 63' and is regulated by a control relay 45' having a regulating valve 50' and a transducer 51' with tubes 59', 64' and 67' which respectively pick up the inlet pressure in the passage, bleed the air from the bellows, and sense the static pressure of the air in a chamber 39' downstream of the damper. The valve and the transducer are supported on the underside of a cover 46' attached to the plate 90.

Downstream of the supporting plate 90, the box 10' is substantially identical in construction to that of the box 10 downstream of the chamber 39. The relay 45' senses the pressure in the chamber 39' downstream of the damper 37' and operates like the control relay 45 to cause the damper to be kept in a position maintaining such pressure substantially constant. With the damper 37', the bellows 40' and the relay 45' all mounted on the common supporting plate 90 which mounts the pipe defining the passage 35', the regulator 31' forms a module that may be attached to the box and installed in the system as a unit with the box.

Still another embodiment of a new and improved induction box 100 is shown in FIG. 7. In this instance, a pressure regulator 101 is fitted within the box upstream of a primary inlet (not shown) and includes a supporting plate 103 mounting a pipe which defines a passage 104 establishing communication between the primary inlet and the inlet duct. A combined reversible actuator and damper in the form of a resiliently flexible diaphragm 105 is positioned upstream of the passage 104 and seals off the downstream end of a chamber 106 defined by a dish-shaped member attached to brackets 107 on the supporting plate, the brackets being spaced angularly from one another to leave radially opening passageways 109 between the passage 104 and the upstream end of the box.

Downstream of the passageway 104, the box 100 is substantially the same as the box 10 downstream of the chamber 39. Primary air flowing into the box 100 enters the chamber 106 through a tube 110 and its pressure expands the diaphragm 105 as shown in phantom in FIG. 7 so that the diaphragm closes off certain areas of the passageways 109 to control the rate of flow through the passage 104. The degree of expansion of the diaphragm is regulated by a control relay 111 fitted into an opening 112 in the lower side of the box. The relay 111 operates similar to the relays 45 and 45' and includes a tube 113 picking up the pressure of the supply air, a tube 114 bleeding the chamber 106 and a tube 115 sensing the pressure downstream of the diaphragm 105. If the pressure downstream of the diaphragm increases or decreases from a set value, the relay causes repositioning of the diaphragm to close or open different areas of the passageways 109.

A heater (not shown) may be used in conjunction with either the box 10' or the box 100. In the case of the box 10', the heater is installed within the box in the chamber 39' between the supporting plate 90 and the primary dampers. With the box 100, the heater is installed in a compartment of the box upstream of the pressure regulator 101 as in the first embodiment.

I claim as my invention:

1. An air induction box having a primary air inlet adjacent one end portion for receiving a supply of primary air under pressure from a supply duct and having an outlet for delivering air toward a point of use, a return air inlet in said box upstream of said outlet for delivering secondary air into the box, means within said box and responsive to the flow of primary air therethrough to induce a flow of secondary air into said box through said return inlet for mixture with said primary air and delivery out of said outlet, and means in said inlets and operable in response to temperature changes at the point of use to increase the rate of flow through one inlet and decrease the rate of flow through the other inlet, or vice versa, by substantially corresponding amounts and thereby maintain a substantially constant volume flow of mixed air out of said outlet, the improvement in said induction box comprising, a regulator module attached to and constituting a unit of said box, said module including:
   a. a support connected to said one end portion of said box downstream of the supply duct and upstream of said primary inlet and defining a passage establishing communication between the supply duct and the primary inlet,
   b. a damper mounted on said support and adjustable to various open positions with respect to said passage to vary the rate of flow therethrough,
   c. a reversible actuator mounted on said support and effective when operated to adjust said damper, and
   d. a control responsive to changes in pressure downstream of said damper for causing operation of said actuator as a function of such pressure changes thereby to maintain a substantially constant pressure between said damper and said primary inlet.

2. An air induction box as defined in claim 1 in which said regulator module is disposed within said box, said one end portion of said box including means adapted for attachment to said supply duct.

3. An air induction box as defined in claim 2 further including a heater disposed within said box between said last-mentioned means and said regulator module, said heater being activated in response to the flow rate through said return inlet increasing to a predetermined value and being operable when activated to raise the temperature of the primary air flowing through said primary inlet.

4. An air induction box as defined in claim 1 in which said regulator module is attached to the upstream end of said box and is disposed outside of the box.

5. An air induction box as defined in claim 4 in which said support comprises a plate covering the upstream end of said box, said passage extending through said plate and being defined in part by a pipe attached to said plate and connected to the supply duct.

6. An air induction box as defined in claim 1 in which said damper is mounted swingably in said passage, said reversible actuator comprising an expandable bellows mounted on said support and connected to swing said damper, said control also being mounted on said support and being operable to govern expansion of said bellows.

7. An air induction box as defined in claim 1 in which said damper comprises a resiliently yieldable diaphragm connected to said support and adapted to be flexed to different positions to cover different areas of said passage and vary the rate of flow therethrough, said actuator comprising a chamber sealed at one end by said diaphragm and communicating at its opposite end with the supply duct whereby the pressure in the supply duct is effective to flex said diaphragm.

8. An air induction box as defined in claim 1 further including a heater disposed within said box upstream of said primary air inlet, said heater being activated in response to the flow rate through said return inlet increasing to a predetermined value and being operable when activated to raise the temperature of the primary air flowing through said primary inlet.

9. An air induction box adapted for connection at one end to a supply duct and having a primary air inlet near said one end for receiving primary air under pressure from the supply duct, said box having an outlet near its opposite end for delivering air toward a point of use, a return air inlet in said box upstream of said outlet for delivering secondary air into the box, means within said box and responsive to the flow of primary air therethrough to induce a flow of secondary air into the box through said return inlet for mixture with said primary air and delivery out of said outlet, and means in said inlets and operable in response to temperature changes at the point of use to increase the rate of flow through one inlet and decrease the rate of flow through the other inlet, or vice versa, by substantially corresponding amounts and thereby maintain a substantially constant volume flow of mixed air out of said outlet, the improvement in said induction box comprising, a regulator module attached to and constituting a unit of said box, said regulator module including:
 a. a support disposed inside of said box between said one end and said primary air inlet and defining a passage establishing communication between the supply duct and the primary air inlet,
 b. a damper mounted on said support and within said box and adjustable to various positions opening different areas of said passage to vary the rate of flow therethrough,
 c. a reversible actuator mounted on said support and within said box and effective when operated to adjust said damper, and
 d. a control mounted on said support and within said box and responsive to changes in pressure downstream of said damper for causing operation of said actuator as a function of such pressure changes thereby to maintain a substantially constant pressure between said damper and said primary inlet.

10. An air induction box as defined in claim 9 further including a heater disposed within said box upstream of said primary inlet, said heater being activated in response to the flow rate through said return inlet increasing to a predetermined value and being operable when activated to raise the temperature of the primary air flowing through said primary inlet.

11. An air induction box having a primary air inlet adjacent one end for receiving a supply of primary air under pressure from a supply duct and having an outlet for delivering air toward a point of use, a return air inlet in said box upstream of said outlet for delivering secondary air into the box, means within said box and responsive to the flow of primary air therethrough to induce a flow of secondary air into said box through said return inlet for mixture with said primary air and delivery out of said outlet, and means in said inlets and operable in response to temperature changes at the point of use to increase the rate of flow through one inlet and decrease the rate of flow through the other inlet, or vice versa, by substantially corresponding amounts and thereby maintain a substantially constant volume flow of mixed air out of said outlet, the improvement in said induction box comprising, a regulator module attached to and constituting a unit of said box, said module including:
 a. a support attached to and covering said one end of said box upstream of said primary inlet and including a pipe adapted for connection to the supply duct and defining a passage establishing communication between the supply duct and the primary inlet,
 b. a damper mounted on said support outside of said box and adjustable to various open positions with respect to said passage to vary the rate of flow therethrough,
 c. a reversible actuator mounted on said support outside of said box and effective when actuated to adjust said damper, and
 d. a control on said support and responsive to changes in pressure downstream of said damper for causing operation of said actuator as a function of such pressure changes thereby to maintain a substantially constant pressure between said damper and said primary inlet.